(12) United States Patent
Ma

(10) Patent No.: US 11,741,094 B2
(45) Date of Patent: Aug. 29, 2023

(54) METHOD AND SYSTEM FOR IDENTIFYING CORE PRODUCT TERMS

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Chaoyi Ma, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 292 days.

(21) Appl. No.: 16/754,737

(22) PCT Filed: Sep. 28, 2018

(86) PCT No.: PCT/CN2018/108230
§ 371 (c)(1),
(2) Date: Apr. 8, 2020

(87) PCT Pub. No.: WO2019/072098
PCT Pub. Date: Apr. 18, 2019

(65) Prior Publication Data
US 2020/0311071 A1    Oct. 1, 2020

(30) Foreign Application Priority Data
Oct. 12, 2017   (CN) .......................... 201710946537.0

(51) Int. Cl.
*G06F 16/245*   (2019.01)
*G06F 16/2452*  (2019.01)
(Continued)

(52) U.S. Cl.
CPC ....... *G06F 16/24522* (2019.01); *G06N 3/045* (2023.01); *G06N 3/08* (2013.01); *G06Q 30/0627* (2013.01)

(58) Field of Classification Search
CPC .. G06F 16/24552; G06N 3/0454; G06N 3/08; G06Q 30/0627
(Continued)

(56) References Cited

U.S. PATENT DOCUMENTS 9,436,895 B1 *  9/2016  Jones ..................... G06N 3/045
10,007,860 B1 *  6/2018  Fotland ............... G06V 40/103
(Continued)

FOREIGN PATENT DOCUMENTS

| CN | 102270234 A | 12/2011 |
|---|---|---|
| CN | 103942693 A | 7/2014 |
| CN | 107832338 A | 3/2018 |

OTHER PUBLICATIONS

English translation of International Search Report for Application No. PCT/CN2018/108230 dated Dec. 20, 2018 (2 pages).

*Primary Examiner* — Hosain T Alam
*Assistant Examiner* — Robert F May
(74) *Attorney, Agent, or Firm* — Michael Best & Friedrich LLP

(57) ABSTRACT

The invention, which discloses a method and a system for identifying a core product term, relates to the technical field of computers. A specific implementation mode of the method comprises: acquiring a display image of a commodity, determining a plurality of candidate product terms included in the title of the commodity, and determining a plurality of product image sets, wherein the respective ones of the plurality of product image sets are in one-to-one correspondence with the respective ones of the plurality of candidate product terms; for each of the plurality of product image sets, determining, according to the display image and
(Continued)

respective images in the product image set, a similarity between the commodity in the display image and the candidate product term corresponding to the product image set to thereby obtain a plurality of similarities; and determining the candidate product term corresponding to a similarity greater than a predetermined threshold among the plurality of similarities as the core product term. The implementation mode incorporates image information into identification of the core product term so that the core product term in the title of the commodity is determined more intuitively and accurately.

9 Claims, 3 Drawing Sheets

(51) Int. Cl.
*G06N 3/08* (2023.01)
*G06Q 30/0601* (2023.01)
*G06N 3/045* (2023.01)

(58) Field of Classification Search
USPC .......................................................... 707/739
See application file for complete search history.

(56) References Cited

U.S. PATENT DOCUMENTS

| | | | |
|---|---|---|---|
| 10,109,051 B1* | 10/2018 | Natesh | G06V 20/10 |
| 2011/0173528 A1 | 7/2011 | Zunger | |
| 2013/0085893 A1* | 4/2013 | Bhardwaj | G06F 16/532 |
| | | | 705/26.62 |
| 2014/0006927 A1* | 1/2014 | Byakod | G06F 16/958 |
| | | | 715/234 |
| 2014/0270497 A1* | 9/2014 | Kannan | G06F 18/256 |
| | | | 382/161 |
| 2016/0155011 A1* | 6/2016 | Sulc | G06V 10/757 |
| | | | 382/103 |
| 2016/0350336 A1* | 12/2016 | Checka | G06V 10/454 |
| 2017/0140248 A1* | 5/2017 | Wang | G06V 10/806 |
| 2018/0060684 A1* | 3/2018 | Ma | G06V 10/82 |
| 2020/0320769 A1* | 10/2020 | Chen | G06F 18/214 |

\* cited by examiner

METHOD AND SYSTEM FOR IDENTIFYING CORE PRODUCT TERMS

CROSS-REFERENCE TO RELATED APPLICATION(S)

This is a U.S. national stage entry of International Patent Application No. PCT/CN2018/108230, filed on Sep. 28, 2018, which claims priority to Chinese Patent Application No. 201710946537.0, filed on Oct. 12, 2017, the entire contents of each of which are fully incorporated herein by reference.

TECHNICAL FIELD

The invention relates to the technical field of computers, and in particular relates to a method and a system for identifying a core product term.

BACKGROUND ART

In the field of e-commerce, an accurate analysis of components of a title of a commodity is a basis for user intention identifications, product recalls, personalized recommendations and so on. Being different from a general natural language analysis, in an e-commerce scene, it is required to distinguish components such as brand terms, modification terms and product terms in the title of the commodity. Moreover, in the field of e-commerce, in order to increase the click volume of the commodity, many commodity sellers will stack and list product terms in the title of the commodity, and even many product terms do not correspond to the commodity. After the seller puts the commodity on the shelf, in order to accurately provide the commodity to buyers, it is required to identify a core product term in the title of the commodity. The core product term in the title of the commodity just refers to the specific product of the commodity described by the title. For example, the core product term in the title "Korean NY Yankees Men's and Women's Caps" is "Caps".

The title of the commodity has characteristics such as unclear semantics and stacked product terms, so how to identify the core product term in the title of the commodity has been always a difficult problem. In the prior art, the methods for identifying the core product term in the title of the commodity mainly include: a vocabulary-based rule method, a conditional random field-based sequence labeling method, and an LSTM-based deep learning method. The vocabulary-based rule method refers to maintaining a mapped vocabulary. For example, as for air conditioner filter-air conditioner, when the terms "air conditioner" and "filter" appear in the title at the same time, the term "filter" is considered to be the core product term. The conditional random field-based sequence labeling method and the LSTM-based deep learning method both use machine learning models to perform training by a large number of corpora, and use the learned models to predict whether a product term in a new title is the core product term.

However, all of the methods for identifying a core product term in a title of a commodity in the prior art only use textual information. To be specific, the vocabulary method does not have the ability to generalize, that is, it cannot process new samples that are not included in the vocabulary, but there are many types of titles of commodities, and it is impossible to include all cases in the vocabulary. In the e-commerce scene, the phenomenon of stacking product terms in the title is serious, and it is difficult to perform parsing using syntactic information, so the machine learning method cannot very effectively identify the core product term in the title of the commodity either. Moreover, various non-standard writing forms of titles of the sellers make it difficult to judge the core product term in the title by simply using textual information.

SUMMARY OF THE INVENTION

In view of the above, the embodiment of the invention provides a method and a system for identifying a core product term, which may determine the core product term in a title of a commodity more effectively, intuitively and accurately, and then may increase qualities of results returned by users, improve user experience, and increase conversions.

In order to achieve the above object, according to one aspect of the embodiment of the invention, a method for identifying a core product term is provided.

The method for identifying a core product term according to the embodiment of the invention comprises: acquiring a display image of a commodity, determining a plurality of candidate product terms included in the title of the commodity, and determining a plurality of product image sets, wherein the respective ones of the plurality of product image sets are in one-to-one correspondence with the respective ones of the plurality of candidate product terms; for each of the plurality of product image sets, determining, according to the display image and respective images in the product image set, a similarity between the commodity in the display image and the candidate product term corresponding to the product image set to thereby obtain a plurality of similarities; and determining the candidate product term corresponding to a similarity greater than a predetermined threshold among the plurality of similarities as the core product term.

Optionally, the step of determining a similarity between the commodity in the display image and the candidate product term corresponding to the product image set comprises: training a Siamese network based on training data to obtain the trained Siamese network; and for each of the plurality of product image sets, determining according to the display image and the respective images in the product image set, the similarity between the commodity in the display image and the candidate product term corresponding to the product image set by the trained Siamese network to thereby obtain the plurality of similarities.

Optionally, before training a Siamese network based on training data to obtain the trained Siamese network, the method further comprises: selecting a predetermined number of training product terms; for each of the training product terms, selecting, according to a commodity search log, two or more search terms including the training product term; for each of the search terms, selecting, according to click volumes and click rates of the commodities under the search term, the same number of commodities and the display images of the commodities; and for each of the training product terms, forming the display images of the commodities belonging to the same search term under the training product term into a positive example pair, and forming the display images of the commodities belonging to the different search terms under the training product term into a negative example pair.

Optionally, the step of training a Siamese network based on training data comprises: for the display images of each of the training product terms in the training data, clustering the display images of the training product term by a clustering algorithm to obtain one or more category centers; using the one or more category centers as the product image set of the training product term; and saving the product image set of each of the training product terms in an image feature library; the step of determining a plurality of product image sets comprises: determining, according to the image feature library, the plurality of product image sets, wherein the respective ones of the plurality of product image sets are in one-to-one correspondence with the respective ones of the plurality of candidate product terms.

Optionally, the plurality of candidate product terms included in the title of the commodity are determined using a conditional random field.

In order to achieve the above object, according to another aspect of the embodiment of the invention, a system for identifying a core product term is provided.

The system for identifying a core product term according to the embodiment of the invention comprises: an acquiring module for acquiring a display image of a commodity, determining a plurality of candidate product terms included in the title of the commodity, and determining a plurality of product image sets, wherein the respective ones of the plurality of product image sets are in one-to-one correspondence with the respective ones of the plurality of candidate product terms; a similarity determining module for, for each of the plurality of product image sets, determining, according to the display image and respective images in the product image set, a similarity between the commodity in the display image and the candidate product term corresponding to the product image set to thereby obtain a plurality of similarities; and a comparing module for determining the candidate product term corresponding to a similarity greater than a predetermined threshold among the plurality of similarities as the core product term.

Optionally, the similarity determining module comprises: a model training unit for training a Siamese network based on training data to obtain the trained Siamese network; and a calculating unit for determining the similarity between the commodity in the display image and the candidate product term corresponding to the product image set by the trained Siamese network.

Optionally, the similarity determining module further comprises a training data acquiring unit for selecting a predetermined number of training product terms; for each of the training product terms, selecting, according to a commodity search log, two or more search terms including the training product term; for each of the search terms, selecting, according to click volumes and click rates of the commodities under the search term, the same number of commodities and the display images of the commodities; and for each of the training product terms, forming the display images of the commodities belonging to the same search term under the training product term into a positive example pair, and forming the display images of the commodities belonging to the different search terms under the training product term into a negative example pair.

Optionally, the model training unit is further used for, for the display images of each of the training product terms in the training data, clustering the display images of the training product term by a clustering algorithm to obtain one or more category centers; using the one or more category centers as the product image set of the training product term; and saving the product image set of each of the training product terms in an image feature library; the acquiring module determines, according to the image feature library, the plurality of product image sets, wherein the respective ones of the plurality of product image sets are in one-to-one correspondence with the respective ones of the plurality of candidate product terms.

Optionally, the acquiring module determines the plurality of candidate product terms included in the title of the commodity using a conditional random field.

In order to achieve the above object, according to a further aspect of the embodiment of the invention, an electronic device for identifying a core product term is provided.

The electronic device for identifying a core product term according to the embodiment of the invention comprises: one or more processors; and a storage device for storing one or more programs, wherein when the one or more programs are executed by the one or more programs, the one or more processors are made to implement the above method for identifying a core product term.

In order to achieve the above object, according to a further aspect of the embodiment of the invention, a computer-readable medium having a computer program stored thereon, characterized in that the program, when executed by a processor, implement the above method for identifying a core product term, is provided.

The above one embodiment of the invention has the following advantages or beneficial effects: the image information of the commodity is incorporated into the judgment of the core product term, so the problem that it is difficult to accurately judge the core product term in the title of the commodity caused by simply using textual information in the prior art is overcome, and then the technical effect of increasing identification accuracy of the core product term of the commodity by means of the image information of the commodity is achieved.

Further effects of the above non-conventional optional manners will be described below in combination with specific implementation modes.

BRIEF DESCRIPTION OF THE DRAWINGS

Figures are used for better understanding of the invention, and do not form improper limitations of the invention. Where.

DETAILED DESCRIPTION

The contents below describe exemplary embodiments of the invention with reference to the figures, including various details of the embodiments of the invention to facilitate understanding, and they shall be considered as exemplary ones only. Thus, those skilled in the art shall recognize that various changes and modifications may be made to the embodiments described herein without departing from the scope and spirit of the invention. Similarly, for clarity and conciseness, descriptions of well-known functions and structures are omitted in the descriptions below.

Figure 1:
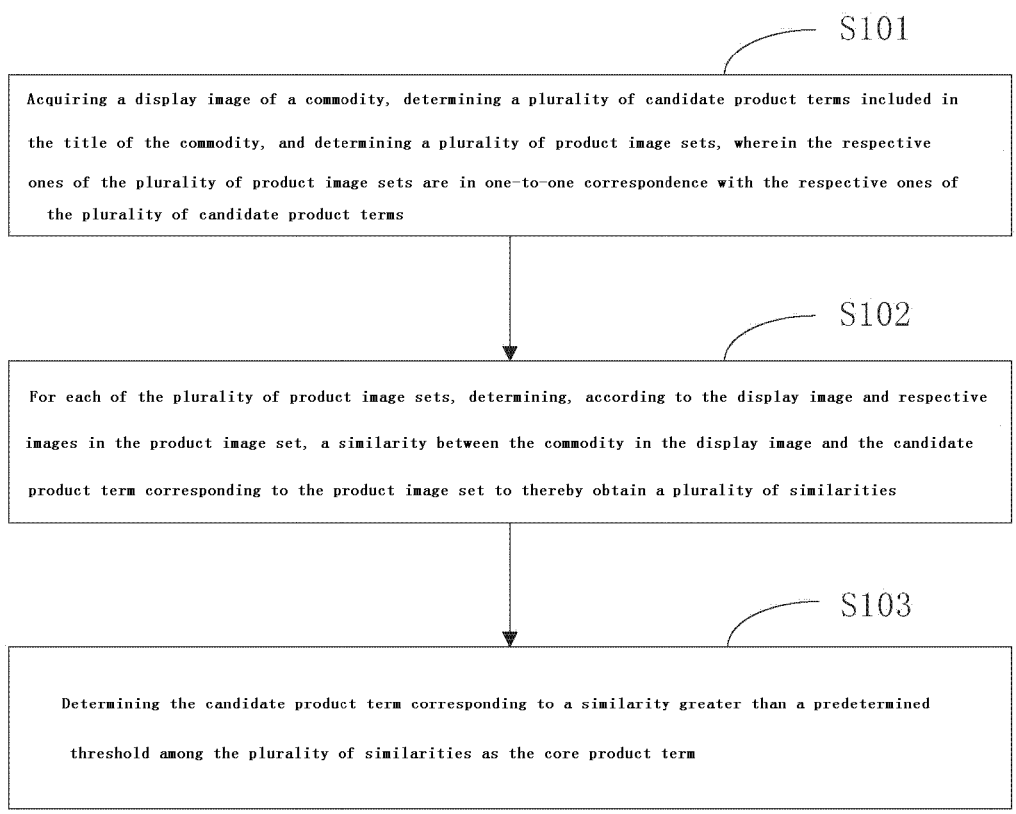
FIG. 1 is a schematic diagram of a main process of a method for identifying a core product term according to an embodiment of the invention.

FIG. 1 is a schematic diagram of a main process of a method for identifying a core product term according to an embodiment of the invention. As shown in FIG. 1, the method for identifying a core product term according to the embodiment of the invention mainly comprises:

Step S101: Acquiring a display image of a commodity, determining a plurality of candidate product terms included in the title of the commodity, and determining a plurality of product image sets, wherein the respective ones of the plurality of product image sets are in one-to-one correspondence with the respective ones of the plurality of candidate product terms. The display image of the commodity refers to the image displayed on the search page when the product is searched for, and the display image is provided and set by the seller and may fully reflect the commodity, so the core product term in the title may be identified more accurately and rapidly according to the display image of the commodity. In step S101, a plurality of candidate product terms included in the title of the commodity may be determined using a conditional random field (CRF). The CRF is a sequence labeling model, which may effectively and accurately label participles and parts of speech, perform named entity identifications thereof and so on.

Each of the candidate product terms corresponds to one product image set, and the images in the product image set may reflect the candidate product term. Moreover, for the product image set of each of the candidate product terms, the product image set includes one or more images, and the commodity corresponding to the candidate product term may be determined according to the images in the product image set. Thus, when determining the similarity in step S102, the similarity between the candidate product term corresponding to the product image set and the commodity may be determined by comparing the images in the product image set with the display image of the commodity. The commodity in the embodiment of the invention is just the commodity whose core product term is to be identified.

Step S102: For each of the plurality of product image sets, determining, according to the display image and respective images in the product image set, a similarity between the commodity in the display image and the candidate product term corresponding to the product image set to thereby obtain a plurality of similarities. The similarity between the commodity in the display image and the candidate product term corresponding to the product image set determined in this step may reflect the similarity between the commodity whose core product term is to be identified and the product represented by the candidate product term.

In the process of determining the similarity between the commodity in the display image and the candidate product term corresponding to the product image set, since there will be many images in one product image set, one similarity will be obtained by comparing each image in the product set with the display image of the commodity whose core product term is to be identified. However, for a product image set of a certain candidate product term, the maximum similarity obtained by comparing all of the images in the product image set with the display image of the commodity whose core product term is to be identified is used as the similarity between the candidate product term and the commodity whose core product term is to be identified. For example, with respect to a commodity A whose core product term is to be identified, the title of the commodity is "Fashionable, Casual and Commercial Dynamic Bicycle Belt, Commercial Dynamic Exercise Bicycle", and after the candidate product terms "Belt", "Bicycle", "Exercise Bicycle" are determined, the product image set of the candidate product term "Belt", the product image set of the candidate product term "Bicycle", and the product image set of the candidate product term "Exercise Bicycle" are obtained, respectively. The product image set of the candidate product term "Belt" includes five images, which are respectively compared with the display image of the commodity A to obtain the similarities of 0.2, 0.5, 0.3, 0.1, 0.4, and then the similarity between the candidate product term "Belt" corresponding to the product image set and the commodity A is 0.5. Similarly, it is determined that the similarity between the commodity A and the candidate product term "Bicycle" is 0.9, and the similarity between the commodity A and the candidate product term "Exercise Bicycle" is 0.85. Thus, after the above process, three similarities, which are respectively 0.5, 0.9 and 0.85, are obtained.

In order to make the method for identifying a core product term according to the embodiment of the invention be implemented more easily and operated more conveniently, the process of step S102 may be performed by a trained model. Thus, the method for identifying a core product term according to the embodiment of the invention further comprises: training a Siamese network based on training data to obtain the trained Siamese network. The Siamese network is a network structure shared by multiple-branch parameters, and is a similarity measurement method. The principle of this network is to use a neural network to extract description operators, obtain feature vectors, and then use feature vectors of two pictures to judge the similarity. The advantage is that those new samples of an untrained category may be distinguished. Because the Siamese network learns a similarity measurement from data (the closer the two things are, the greater their similarity measurement is, and the farther the two things are, the smaller their similarity measurement is), and the measurement learnt is used to be compared with and match new samples of an unknown category.

The method for identifying a core product term according to the embodiment of the invention further comprises acquiring training data. In the process of acquiring the training data, a predetermined number of training product terms are selected; for each of the training product terms, two or more search terms including the training product term are selected based on a commodity search log; for each of the search terms, the same number of commodities and the display images of the commodities are selected according to click volumes and click rates of the commodities under the search term; and for each of the training product terms, the display images of the commodities belonging to the same search term under the training product term are formed into a positive example pair, and the display images of the commodities belonging to the different search terms under the training product term are formed into a negative example pair. For each of the training product terms, a positive example pair and a negative example pair may be acquired, and the positive example pairs and the negative example pairs of all of the product terms form the training data. Thus, the Siamese network is trained based on the acquired positive example pairs and negative example pairs. The Siamese network is trained based on the following assumption: the commodities under the same product term are similar, and the commodities under the different product terms are not similar. Although the commodities under the different product terms may be the same, they are still not similar in the case of a large similarity in the training process. For example, 6,000 training product terms are selected, if the product term "refrigerator" has five commodities similar to those of the different product term "air conditioner", it is possible that the error is only 5/6000, and then it is feasible to assume that the commodities under the same product term are similar, and the commodities under the different product terms are not similar. For example, 6,000 training product terms are selected; for each of the training product terms, two search terms including the training product term are selected, that is, 12,000 in total; top 20 commodities in terms of click volumes and click rates under each of the search terms are selected, and the display images of the commodities are correspondingly acquired, that is, 240,000 images in all. For a display image of a certain commodity under each of the training product terms, the display image of another commodity under the same search term may be selected to form a positive example pair, the display image of the commodity under another search term may be selected to form a negative example pair, and 480,000 pairs of training data are finally obtained.

The Siamese network is trained based on the above acquired training data to obtain the trained Siamese network. The trained Siamese network may be applied to display pictures of all of commodities in a commodity library, and the core product term of each of the commodities is determined. Then, one or more product image sets may be obtained, each product image set corresponds to one product term, and the product set includes one or more images or the image features of the one or more images.

In the process of training the Siamese network according to the embodiment of the invention, with respect to a polysemous product term (the product term having multiple understandings), the display images of all of the product terms may be processed by a clustering algorithm (DBSACN) to obtain one or more category centers, and the one or more category centers are used as the product image set of the product term. The DBSACN is a density-based clustering algorithm, which divides high-density intervals into clusters and may find arbitrary shapes in a spatial database of noise. After one or more category centers are used as the product image set of the product term, the product image set of each of the product terms is saved in an image feature library. Thus, when determining the product image set corresponding to each of the candidate product terms, a plurality of product image sets may be determined according to the image feature library.

Moreover, for each of the plurality of product image sets, the similarity between the commodity in the display image and the candidate product term corresponding to the product image set may be determined by the trained Siamese network according to the display image and the respective images in the product image set to thereby obtain the plurality of similarities.

Step S103: Determining the candidate product term corresponding to a similarity greater than a predetermined threshold among the plurality of similarities as the core product term. The similarity obtained in step S102 is the similarity between the commodity in the display image and the candidate product term corresponding to the product image set, and for each of the similarities, it corresponds to the candidate product term that determines the similarity. Thus, after obtaining the plurality of similarities, each of the similarities corresponds to one candidate product term. Moreover, each of the similarities reflects the similarity between the commodity represented by one candidate product term and the commodity whose core product term is to be identified. After obtaining the similarity corresponding to each of the candidate product terms, one or more candidate product terms may be determined as core product term(s) according to a predetermined threshold. For example, with respect to the title of the commodity "Fashionable, Casual and Commercial Dynamic Bicycle Belt, Commercial Dynamic Exercise Bicycle", the candidate product terms are "Belt", "Bicycle" and "Exercise Bicycle", and it is obtained by the display picture of the commodity and the product image sets of the candidate product terms that the similarities between the commodity and the candidate product terms "Belt", "Bicycle" and "Exercise Bicycle" are 0.5, 0.9 and 0.85, respectively, so 0.5 corresponds to the candidate product term "Belt", 0.9 corresponds to the candidate product term "Bicycle", and 0.85 corresponds to the candidate product term "Exercise Bicycle". If the predetermined threshold is 0.8, the candidate product terms "Bicycle" and "Exercise Bicycle" are selected as the core product terms of the commodity.

Figure 2:
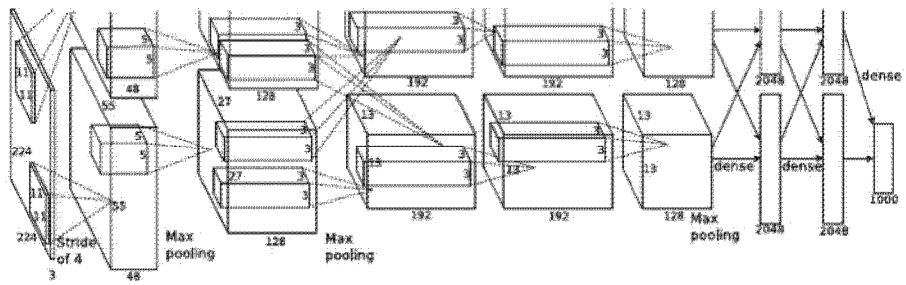
FIG. 2 is a structural schematic diagram of a Siamese network.

FIG. 2 is a structural schematic diagram of a Siamese network. It may be seen from FIG. 2 that the first five layers of the Siamese network are Alexnet, each layer of the Alexnet includes a convolution function and a pooling function, the last three layers of the Siamese network are fully connected layers, and the final loss function is a contrast loss function. The Alexnet is a classic network structure in the field of images, including a multi-layer convolution structure.

After acquiring the training data, the Siamese network is trained. Moreover, the trained Siamese network is applied to the commodity library to perform an image feature extraction, and a dimension-reduction representation of each image may be obtained. The dimension-reduction representation is just to use a low-dimensional vector to represent a high-dimensional vector, and if the original image is directly stored, the performance will be influenced due to occupation of too many resources. After acquiring the display image of each of the commodities in the commodity library, the display image is put in the trained Siamese network to be subjected to the image feature extraction after the dimension thereof is converted into 220*220*3. The image feature extraction in this process is just to input the original picture into the trained Siamese network, calculate it layer by layer, and finally obtain a 20-dimensional vector as its dimension-reduction representation. The original picture dimension is 220*220*3=145,200. The trained Siamese network may extract features for a full amount of billion-level commodities, and may perform the feature extraction for an increased amount of million-level data every day.

After obtaining the image features of each commodity in the commodity library by the trained Siamese network, the trained Siamese network is required to summarize the image features of the commodity to obtain feature representation of all of product terms included in the commodity library. This process generally includes two steps of acquisition of high-confidence commodities under a product term and clustering for a polysemous product term.

For the acquisition of high-confidence commodities under a product term, since there are many commodities of a certain product term in the commodity library, it is required to acquire the high-confidence commodities that are indeed consistent with the product term for clustering. In this process, user feedback data (search log) may be used to cluster click logs of the past nine months in the feedback data and extract the commodities with sufficient click volumes and high click rates, such as the commodities having top 200 click volumes and top 50 click rates under the product term.

The clustering for a polysemous product term is performed because each product term may have multiple meanings. For example, the product term "Apple" may be either a mobile phone or a kind of fruit. Each of the meanings may have one picture form. For example, as for the product term "underwear", the picture may be a piece of clothes or underwear in a box. With respect to the case where the product term has multiple meanings, the images under the product term may be clustered, and the category center is taken for each category (weighted average of vectors in this category, and the weight may be the click rate of the commodity). The clustering method is DBSCAN (Density-Based Spatial Clustering of Applications with Noise), the distance between the vectors is a Euclidean distance, the minimum distance between the categories is set to 0.3, and the minimum number of samples in each category is 4. After the clustering, one category center may be obtained for each meaning, and each category center is used as the image feature representation of the product term. For each of the product terms, a plurality of category centers are retained as its final image feature representation, and the number of retained category centers may be set.

After training the Siamese network and using the trained Siamese network to acquire the product terms included in the commodity library and the image feature representation (product image set) of each of the product terms, when confirming the core product term of the commodity whose core product term is to be identified, the image feature representation of each of the candidate product terms may be acquired using the trained Siamese network after the candidate product terms included in the title of the commodity are determined by the CRF. Moreover, the image feature representation of the display image of the commodity whose core product term is to be identified is extracted by the trained Siamese network, the trained Siamese network compares the image feature representation of each of the candidate product terms with the image feature representation of the display image of the commodity whose core product term is to be identified to determine the similarity between the commodity whose core product term is to be identified and the commodity represented by each of the candidate product terms, that is, the similarity between the commodity in the display image and the candidate product term corresponding to the product image set, and the similarity is obtained by calculating the inner product of the vector of the display image of the commodity whose core product term is to be identified and the vector of the candidate product term.

Thus, after the completion of the training of the Siamese network based on the training data, as long as the display image of the commodity whose core product term is to be identified and the product image set of each of the candidate product terms are input into the trained Siamese network, the trained Siamese network may output the similarity between the commodity whose core product term is to be identified and the commodity represented by each of the candidate product terms. Further, the candidate product term having a similarity greater than the predetermined threshold is determined as the core product term. Thus, the Siamese network is trained so that the method for identifying a core product term according to the embodiment of the invention is implemented more conveniently, and the core product term in the title of the commodity may be identified more rapidly.

As for the search, the first task is to identify the intention of the search user and return accurate results. If the product term (what product is sold by the commodity) is not considered, and only the recall manner of the text is considered, a large number of wrong results will be brought to the search user, and the wrong product term identification results will also directly lead to that the correct commodity cannot be recalled or the wrong results are returned to the search user. For the method for identifying a core product term according to the embodiment of the invention, the image information may be incorporated into the judgment of the core product term, and this manner is not only intuitive but also effective. In some cases, it is difficult for people to distinguish the core product term by simply using textual information, and an image identification is always more intuitive. Applying images to the identification of the core product term plays an important role in increasing qualities of returned results, improving user experience, and increasing conversions.

Figure 3:
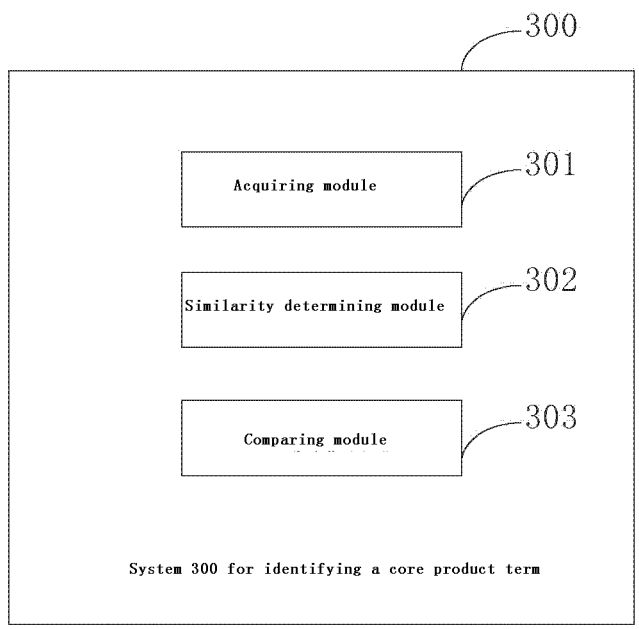
FIG. 3 is a schematic diagram of main modules of a system for identifying a core product term according to an embodiment of the invention.

FIG. 3 is a schematic diagram of main modules of a system for identifying a core product term according to an embodiment of the invention. As shown in FIG. 3, a system 300 for identifying a core product term according to the embodiment of the invention mainly comprises:

An acquiring module 301 for acquiring a display image of a commodity, determining a plurality of candidate product terms included in the title of the commodity, and determining a plurality of product image sets, wherein the respective ones of the plurality of product image sets are in one-to-one correspondence with the respective ones of the plurality of candidate product terms. The acquiring module 301 determines the plurality of candidate product terms included in the title of the commodity using a conditional random field, which may determine the plurality of candidate product terms included in the title of the commodity accurately and rapidly.

A similarity determining module 302 for, for each of the plurality of product image sets, determining, according to the display image and respective images in the product image set, a similarity between the commodity in the display image and the candidate product term corresponding to the product image set to thereby obtain a plurality of similarities. The similarity determining module 302 comprises a model training unit for training a Siamese network based on training data to obtain the trained Siamese network; and a calculating unit for determining the similarity between the commodity in the display image and the candidate product term corresponding to the product image set by the trained Siamese network. The similarity determining module 302 further comprises a training data acquiring unit for acquiring the training data. The step of acquiring the training data by the training data acquiring unit comprises: selecting a predetermined number of training product terms; for each of the training product terms, selecting, according to a commodity search log, two or more search terms including the training product term; for each of the search terms, selecting, according to click volumes and click rates of the commodities under the search term, the same number of commodities and the display images of the commodities; and for each of the training product terms, forming the display images of the commodities belonging to the same search term under the training product term into a positive example pair, and forming the display images of the commodities belonging to the different search terms under the training product term into a negative example pair. Then, for each of the training product terms, a positive example pair and a negative example pair may be acquired, and the positive example pairs and the negative example pairs of all of the product terms form the training data.

The model training unit is further used for, for the display images of each of the training product terms in the training data, clustering the display images of the training product term by a clustering algorithm to obtain one or more category centers; using the one or more category centers as the product image set of the training product term; and saving the product image set of each of the training product terms in an image feature library. Then, the acquiring module determines, according to the image feature library, the plurality of product image sets, wherein the respective ones of the plurality of product image sets are in one-to-one correspondence with the respective ones of the plurality of candidate product terms.

A comparing module 303 for determining the candidate product term corresponding to a similarity greater than a predetermined threshold among the plurality of similarities obtained by the similarity determining module as the core product term.

The system for identifying a core product term according to the embodiment of the invention trains the Siamese network by the model training unit of the similarity determining module to obtain the trained Siamese network. After the acquiring module acquires the display picture of the commodity whose core product term is to be identified, determines the plurality of candidate product terms included in the commodity whose core product term is to be identified, and determines the product image set corresponding to each of the candidate product terms, the calculating unit of the similarity determining module determines the similarity between the commodity whose core product term is to be identified and each of the candidate product terms by the trained Siamese network. The comparing module determines the candidate product term corresponding to the similarity greater than the predetermined threshold among the plurality of similarities as the core product term. The system for identifying a core product term according to the embodiment of the invention incorporates the image information of the commodity into the judgment of the core product term, which overcomes the problem that it is difficult to accurately judge the core product term in the title caused by simply using textual information in the prior art, and then achieves the technical effect of increasing identification accuracy of the core product term of the commodity by means of the image information of the commodity.

Figure 4:
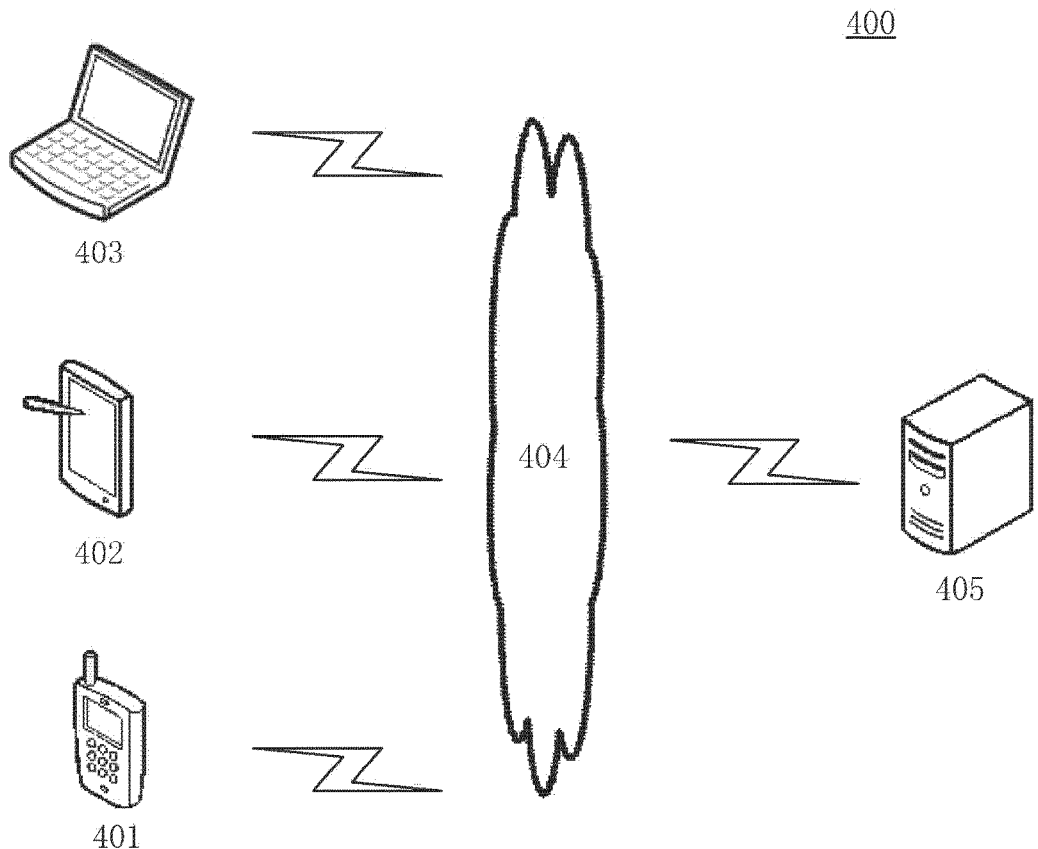
FIG. 4 is an exemplary system architecture diagram to which an embodiment of the invention may be applied.

FIG. 4 shows an exemplary system architecture 400 to which the method for identifying a core product term or the system for identifying a core product term according to an embodiment of the invention may be applied.

As shown in FIG. 4, the system architecture 400 may comprise terminal devices 401, 402, 403, a network 404, and a server 405. The network 404 is a medium for providing a communication link between the terminal devices 401, 402, 403 and the server 405. The network 404 may include various connection types, such as wired or wireless communication links, or fiber-optic cables and so on.

The user may use the terminal devices 401, 402, 403 to interact with the server 405 through the network 404 to receive or send messages and so on. Various communication client applications may be installed on the terminal devices 401, 402, 403, such as shopping applications, web browser applications, search applications, instant messaging tools, email clients, social platform software and so on (only examples).

The terminal devices 401, 402, 403 may be various electronic devices having display screens and supporting web browsing, including but not limited to smart phones, tablet computers, laptop portable computers, desktop computers and so on.

The server 405 may be a server that provides various services, for example, a background management server that provides support for shopping websites browsed by the user using the terminal devices 401, 402, 403 (only an example). The background management server may process, for example, analyze the received request for querying product information and other data, and feed the processing results (such as target push information and product information-only examples) back to the terminal devices.

It shall be noted that the method for identifying a core product term provided by the embodiment of the invention is generally executed by the server 405, and correspondingly, the system for identifying a core product term is generally provided in the server 405.

It shall be understood that the numbers of the terminal devices, the networks, and the servers in FIG. 4 are merely schematic. According to implementation requirements, there may be any numbers of the terminal devices, the networks, and the servers.

Figure 5:
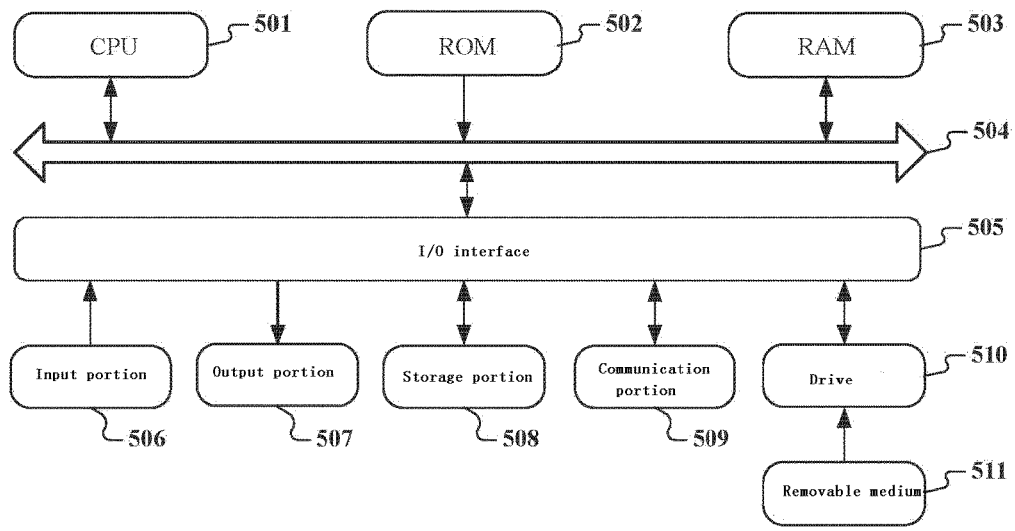
FIG. 5 is a structural schematic diagram of a computer system suitable for implementing a terminal device or a server according to an embodiment of the invention.

Reference is now made to FIG. 5, which shows a structural schematic diagram of a computer system 500 suitable for implementing a terminal device according to an embodiment of the invention. The terminal device shown in FIG. 5 is only an example, and shall not impose any limitation on the functions and the scope of use of the embodiment of the invention.

As shown in FIG. 5, the computer system 500 includes a central processing unit (CPU) 501, which may perform various appropriate actions and processes according to a program stored in a read-only memory (ROM) 502 or a program loaded from a storage portion 508 into a random access memory (RAM) 503. Various programs and data required for the operation of the system 500 are also stored in the RAM 503. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse and so on; an output portion 507 including a cathode ray tube (CRT), a liquid crystal display (LCD) and so on, and a speaker and so on; a storage portion 508 including a hard disk and so on; and a communication portion 509 including a network interface card such as a LAN card, a modem and so on. The communication portion 509 performs communication processing via a network such as the Internet. A drive 510 is also connected to the I/O interface 505 according to requirements. A removable medium 511, such as a magnetic disk, an optical disk, a magneto-optical disk, a semiconductor memory and so on, is installed on the drive 510 according to requirements so that a computer program read therefrom is installed in the storage portion 508 according to requirements.

In particular, according to the embodiment disclosed in the invention, the process described above with reference to the flowchart may be implemented as a computer software program. For example, the embodiment disclosed in the invention includes a computer program product, which includes a computer program carried on a computer-readable medium, the computer program containing a program code for performing the method shown in the flowchart. In such embodiment, the computer program may be downloaded and installed from the network through the communication portion 509, and/or installed from the removable medium 511. When the computer program is executed by the central processing unit (CPU) 501, the above functions defined in the system according to the invention are executed.

It shall be noted that the computer-readable medium shown in the invention may be a computer-readable signal medium or a computer-readable storage medium or any combination of the above two media. The computer-readable storage medium may be, for example, but not limited to, an electronic, magnetic, optical, electromagnetic, infrared, or semiconductor system, apparatus or device, or any combination thereof. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the invention, the computer-readable storage medium may be any tangible medium containing or storing a program, and the program may be used by or in combination with an instruction execution system, apparatus or device. In the invention, the computer-readable signal medium may include a data signal propagated in a baseband or propagated as a part of a carrier wave, in which a computer-readable program code is carried. Such propagated data signal may adopt many forms, including but not limited to electromagnetic signals, optical signals, or any suitable combination thereof. The computer-readable signal medium may be also any computer-readable medium other than the computer-readable storage medium, and the computer-readable medium may send, propagate, or transmit a program for use by or in connection with the instruction execution system, apparatus or device. The program code contained on the computer-readable medium may be transmitted using any appropriate medium, including but not limited to wireless, wire, optical cable, RF and so on, or any suitable combination thereof.

The flowcharts and block diagrams in the figures illustrate architectures, functions and operations that may be implemented by systems, methods and computer program products according to various embodiments of the invention. In this regard, each block in the flowcharts or block diagrams may represent a module, a program segment, or a part of a code, which contains one or more executable instructions for implementing specified logic functions. It shall be also noted that in some alternative implementations, the functions labeled in the blocks may occur in an order different from that labeled in the figures. For example, two successively represented blocks may actually be executed substantially in parallel, and they may sometimes be executed in a reverse order, which depends on the functions involved. It shall be also noted that each block in the block diagrams or flowcharts, and combinations of the blocks in the block diagrams or flowcharts may be implemented with a dedicated hardware-based system that performs specified functions or operations, or may be implemented with a combination of dedicated hardware and computer instructions.

The involved modules described in the embodiment of the invention may be implemented by software or hardware. The described modules may be also provided in a processor. For example, a description may be made as follows: a processor comprises an acquiring module, a similarity determining module, and a comparing module. The names of these modules do not form limitations of the modules themselves in some cases. For example, the comparing module may be also described as "a module that determines the candidate product term having a similarity greater than a predetermined threshold as the core product term".

As another aspect, the invention also provides a computer-readable medium, which may be included in the devices described in the above embodiment, or may exist independently without being assembled into the devices. The above computer-readable medium carries one or more programs, and when the one or more programs are executed by one of the devices, the device is made to include: acquiring a display image of a commodity, determining a plurality of candidate product terms included in the title of the commodity, and determining a plurality of product image sets, wherein the respective ones of the plurality of product image sets are in one-to-one correspondence with the respective ones of the plurality of candidate product terms; for each of the plurality of product image sets, determining, according to the display image and respective images in the product image set, a similarity between the commodity in the display image and the candidate product term corresponding to the product image set to thereby obtain a plurality of similarities; and determining the candidate product term corresponding to a similarity greater than a predetermined threshold among the plurality of similarities as the core product term.

According to the technical solution of the embodiment of the invention, the image information may be incorporated into the judgment of the core product term, and this manner is not only intuitive but also effective. Applying images to the identification of the core product term plays an important role in increasing qualities of returned results, improving user experience, and increasing conversions.

The above specific implementation modes do not form limitations on the scope of protection of the invention. It shall be understood by those skilled in the art that various modifications, combinations, sub-combinations and substitutions may occur depending on design requirements and other factors. Any modification, equivalent replacement, improvement and so on made within the spirit and principle of the invention shall be included in the scope of protection of the invention.

The invention claimed is:

1. A method for identifying a core product term, the method comprising: acquiring a display image of a commodity whose core product term is to be identified; determining a plurality of candidate product terms included in the title of the commodity whose core product term is to be identified; identifying the core product term of the commodity whose core product is to be identified from the plurality of candidate product terms based on the display image, wherein identifying the core product term of the commodity whose core product is to be identified from the plurality of candidate product terms based on the display image includes: determining a numerical similarity between the display image of the commodity whose core product term is to be identified and the each one of the plurality of candidate product terms, thereby obtaining a plurality of numerical similarities, and determining the candidate product term corresponding to a numerical similarity greater than a predetermined numerical threshold among the plurality of numerical similarities as the core product term for the commodity whose core product term is to be identified, wherein determining the numerical similarity between the display image of the commodity whose core product term is to be identified and the each one of the plurality of candidate product terms includes: training a Siamese network based on training data to obtain a trained Siamese network, and based on the trained Siamese network: obtaining image features of each commodity in a commodity library and summarizing the image features of the commodity to obtain a feature representation of product terms included in the commodity library, determining a plurality of product image sets of the plurality of candidate product terms according to the determined plurality of candidate product terms included in the title of the commodity whose core product term is to be identified and the feature representation of product terms included in the commodity library, wherein the respective ones of the plurality of product image sets are in one-to-one correspondence with the respective ones of the plurality of candidate product terms, and for each of the plurality of product image sets, determining, according to the display image and respective images in the product image set, a numerical similarity between the display image of the commodity whose product term is to be identified and the product image set to thereby obtain numerical similarities corresponding to each one of the plurality of candidate product terms, wherein obtaining the feature representation of the product terms included in the commodity library includes: acquiring commodities under the product terms in the commodity library by using user feedback data within a period of time, wherein the user feedback data includes search log or click logs, and clustering for a polysemous product term to generate feature representation for each meaning of the polysemous product term.

2. The method according to claim 1, wherein, before training the Siamese network based on training data to obtain the trained Siamese network, the method further comprises: selecting a predetermined number of training product terms; for each of the training product terms, selecting, according to a commodity search log, two or more search terms including the training product term; for each of the search terms, selecting, according to click volumes and click rates of the commodities under the search term, the same number of commodities and the display images of the commodities; and for each of the training product terms, forming the display images of the commodities belonging to the same search term under the training product term into a positive example pair, and forming the display images of the commodities belonging to the different search terms under the training product term into a negative example pair.

3. The method according to claim 2, wherein training the Siamese network based on training data includes for the display images of each of the training product terms in the training data, clustering the display images of the training product term by a clustering algorithm to obtain one or more category centers; using the one or more category centers as the product image set of the training product term; and saving the product image set of each of the training product terms in an image feature library; and wherein determining the plurality of product image sets includes: determining, according to the image feature library, the plurality of product image sets, wherein the respective ones of the plurality of product image sets are in one-to-one correspondence with the respective ones of the plurality of candidate product terms.

4. The method according to claim 1, wherein the plurality of candidate product terms included in the title of the commodity whose core product is to be identified are determined using a conditional random field.

5. An apparatus for identifying a core product term, comprising: one or more processors, the one or more processors being configured to: acquire a display image of a commodity whose core product is to be identified, determine a plurality of candidate product terms included in the title of the commodity whose core product term is to be identified, and identify the core product term of the commodity whose core product term is to be identified from the plurality of candidate product terms based on the display image, wherein identifying the core product term of the commodity whose core product is to be identified from the plurality of candidate product terms based on the display image includes: determining a numerical similarity between the display image of the commodity whose core product term is to be identified and the each one of the plurality of candidate product terms, thereby obtaining a plurality of numerical similarities, and determining the candidate product term corresponding to a numerical similarity greater than a predetermined numerical threshold among the plurality of numerical similarities as the core product term for the commodity whose core product term is to be identified, wherein determining the numerical similarity between the display image of the commodity whose core product term is to be identified and the each one of the plurality of candidate product terms includes: training a Siamese network based on training data to obtain a trained Siamese network, and based on the trained Siamese network: obtaining image features of each commodity in a commodity library and summarizing the image features of the commodity to obtain a feature representation of product terms included in the commodity library, determining a plurality of product image sets of the plurality of candidate product terms according to the determined plurality of candidate product terms included in the title of the commodity whose core product term is to be identified and the feature representation of product terms included in the commodity library, wherein the respective ones of the plurality of product image sets are in one-to-one correspondence with the respective ones of the plurality of candidate product terms, and for each of the plurality of product image sets, determining, according to the display image and respective images in the product image set, a numerical similarity between the display image of the commodity whose core product term is to be identified and the product image set to thereby obtain numerical similarities corresponding to each one of the plurality of candidate product terms, wherein obtaining the feature representation of the product terms included in the commodity library includes: acquiring commodities under the product terms in the commodity library by using user feedback data within a period of time, wherein the user feedback data includes search log or click logs, and clustering for a polysemous product term to generate feature representation for each meaning of the polysemous product term.

6. The apparatus according to claim 5, wherein the one or more processors further being configured to: select a predetermined number of training product terms; for each of the training product terms, select, according to a commodity search log, two or more search terms including the training product term; for each of the search terms, select, according to click volumes and click rates of the commodities under the search term, the same number of commodities and the display images of the commodities; and for each of the training product terms, form the display images of the commodities belonging to the same search term under the training product term into a positive example pair, and form the display images of the commodities belonging to the different search terms under the training product term into a negative example pair.

7. The apparatus according to claim 6, wherein one or more processors further being configured to, for the display images of each of the training product terms in the training data, cluster the display images of the training product term by a clustering algorithm to obtain one or more category centers; use the one or more category centers as the product image set of the training product term; and save the product image set of each of the training product terms in an image feature library; determine, according to the image feature library, the plurality of product image sets, wherein the respective ones of the plurality of product image sets are in one-to-one correspondence with the respective ones of the plurality of candidate product terms.

8. The apparatus according to claim 5, wherein one or more processors further being configured to determine the plurality of candidate product terms included in the title of the commodity whose core product term is to be identified using a conditional random field.

9. A non-transitory computer-readable medium storing a processor-executable instructions, wherein when the processor-executable instructions are executed by a processor cause the apparatus to: acquire a display image of a commodity whose core product term is to be identified; determine a plurality of candidate product terms included in the title of the commodity whose core product term is to be identified; and identify a core product term of the commodity whose core product term is to be identified from the plurality of candidate product terms based on the display image, wherein identifying the core product term of the commodity whose core product is to be identified from the plurality of candidate product terms based on the display image includes: determining a numerical similarity between the display image of the commodity whose core product term is to be identified and the each one of the plurality of candidate product terms, thereby obtaining a plurality of numerical similarities, and determining the candidate product term corresponding to a numerical similarity greater than a predetermined numerical threshold among the plurality of numerical similarities as the core product term for the commodity whose core product term is to be identified, wherein determining the numerical similarity between the display image of the commodity whose core product term is to be identified and the each one of the plurality of candidate product terms includes: training a Siamese network based on training data to obtain a trained Siamese network, and based on the trained Siamese network: obtaining image features of each commodity in a commodity library and summarizing the image features of the commodity to obtain a feature representation of product terms included in the commodity library, determining a plurality of product image sets of the plurality of candidate product terms according to the determined plurality of candidate product terms included in the title of the commodity whose core product term is to be identified and the feature representation of product terms included in the commodity library, wherein the respective ones of the plurality of product image sets are in one-to-one correspondence with the respective ones of the plurality of candidate product terms, and for each of the plurality of product image sets, determine, according to the display image and respective images in the product image set, a numerical similarity between the display image of the commodity whose core product term is to be identified and the product image set to thereby obtain numerical similarities corresponding to each one of the plurality of candidate product terms, wherein obtaining the feature representation of the product terms included in the commodity library includes: acquiring commodities under the product terms in the commodity library by using user feedback data within a period of time, wherein the user feedback data includes search log or click logs, and clustering for a polysemous product term to generate feature representation for each meaning of the polysemous product term.

* * * * *